United States Patent [19]

Sullivan et al.

[11] Patent Number: 5,098,461
[45] Date of Patent: Mar. 24, 1992

[54] PHOSPHATIC AND NITROGEN FERTILIZERS VIA HNO₃ PROCESSING

[75] Inventors: Jack M. Sullivan; John H. Grinstead, Jr., both of Florence, Ala.

[73] Assignee: Tennessee Valley Authority, Muscle Shoals, Ala.

[21] Appl. No.: 458,022

[22] Filed: Dec. 28, 1989

[51] Int. Cl.⁵ .................. C01B 25/32; C05B 11/06
[52] U.S. Cl. .................. 71/39; 423/319; 423/395
[58] Field of Search ............ 423/319, 395; 71/39

[56] References Cited

U.S. PATENT DOCUMENTS

| | | | |
|---|---|---|---|
| 1,905,930 | 4/1933 | McCallum et al. | 423/395 |
| 2,753,252 | 7/1956 | Barnes | 71/43 |
| 3,528,797 | 9/1970 | Funk et al. | 71/39 |
| 3,563,703 | 2/1971 | Camp | 423/167 |
| 3,702,885 | 11/1972 | Markey | 423/319 |
| 4,008,315 | 2/1977 | Philippi et al. | 423/319 |

Primary Examiner—Wayne A. Langel
Attorney, Agent, or Firm—Robert A. Petrusek

[57] ABSTRACT

A process for producing high-analysis dicalcium phosphate containing phosphatic fertilizers and by-product calcium nitrate. It comprises reacting phosphate rock with nitric acid, followed by pyrolysis of the resulting acidulate to effect liberation of approximately one-half of the initially consumed nitric acid. Recycling of this liberated nitric acid allows production of available phosphate with approximately one-half the acid equivalents normally consumed during sulfuric acid processing. The calcium nitrate in the resulting pyrolyzate is separated from the phosphatic constituent by dissolution in water followed by filtration. Depending upon the initial HNO₃:CaO acidulation ratio, the available phosphate content of the resulting solid phosphatic fertilizers is high enough (48% $P_2O_5$) to allow their use either for bulk blending with nitrogen and potash salts to produce complete grade fertilizers or for direct application as a phosphate nutrient. The resulting calcium nitrate stream may be processed to produce a variety of solid or fluid nitrogen fertilizer products. No "throw away" by-products (other than possibly siliceous gangue) are produced.

11 Claims, 1 Drawing Sheet

NITRATE AND PHOSPHATE PRODUCTION WITH REDUCED BY-PRODUCTS

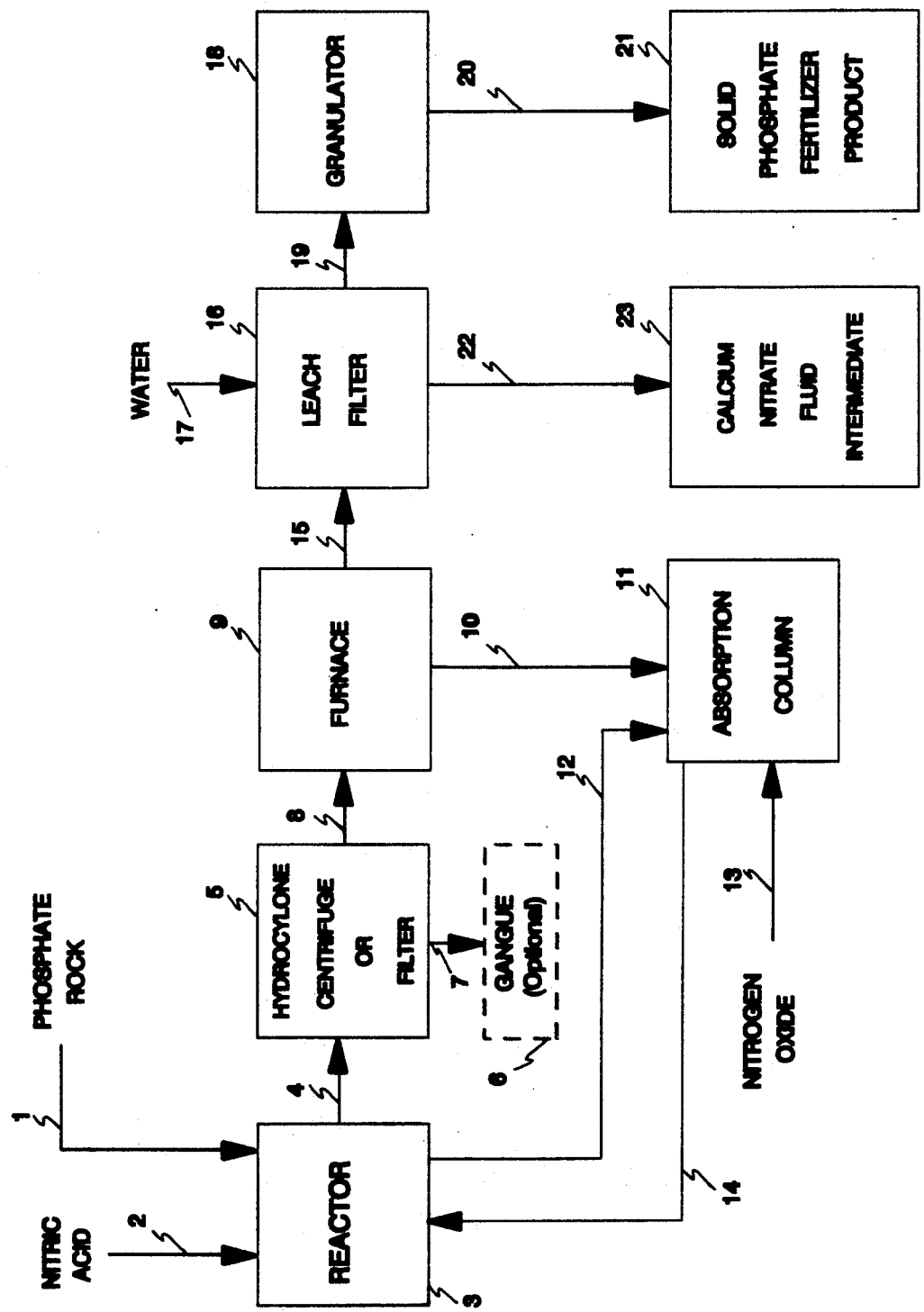

PHOSPHATIC AND NITROGEN FERTILIZERS VIA HNO₃ PROCESSING

The invention herein described may be manufactured and used by or for Government for governmental purposes without the payment to use of any royalty therefor.

INTRODUCTION

The phosphate values in phosphatic ores are generally too insoluble for direct utilization by food-producing crops. Current phosphate fertilizer technology within the United States generally involves the reaction of phosphate ores with sulfuric acid to produce soluble phosphatic materials which may be further processed to produce a variety of fertilizer products. The principal function of the sulfuric acid is to solubilize the phosphate content of the ore while converting the calcium component to an insoluble calcium sulfate salt, usually gypsum ($CaSO_4 \cdot 2H_2O$). Normally about five tons of gypsum are produced for each ton of $P_2O_5$ solubilized. This calcium sulfate by-product is generally of little agronomic or commercial value and serves as a disposal problem for the industry. For instance, storage of unused phosphogypsum ($CaSO_4 \cdot 2H_2O$) in Florida now stands at 500 million tons and continues to accumulate at a rate of approximately 30 million tons per year (R. G. Lytch, "Effects of Impurities on the Phosphate Rock Market Place," presented at the 192nd National American Chemical Society Meeting, Sept. 7–12, 1986, Anaheim, Calif.). As indicated above, this waste by-product results from the sulfuric acid processing of phosphate rock to produce phosphoric acid as indicated by the chemical equation below (phosphate rock is depicted as fluorapatite).

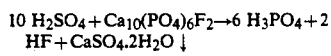

The liquid phosphoric acid and fluoride are filtered from the mix and utilized in the production of various fertilizers (90% of total usage) and other phosphate products. The insoluble phosphogypsum, "mud," is of no economic value and is pumped atop artificial hills or stacks where it is allowed to drain dry in storage. Phosphogypsum stacks approaching 200 feet in height and covering several hundred acres of land area are now evident in many locations within the central portion of Florida. Despite years of research, no economical use for such phosphogypsum has been found.

In addition to esthetical and land use concerns, recent environmental initiatives have identified numerous potential health hazards associated with the stacking and storage of phosphogypsum. These include the release of radionuclides, the accumulation of toxic heavy metals, and the entrance of residual fluorides into the groundwater and atmosphere (Publication No. 05-016-059, "Release of Radium and Other Decay-Series Isotopes from Florida Phosphate Rock," Florida Institute of Phosphate Research, Bartow, Fla., January 1988; and P. Becker, *Phosphates and Phosphoric Acid: Raw Materials, Technology, and Economics of the Wet Process*, Second Edition, Marcel Dekker, Inc., New York, N.Y., 1989). Increasing land value and environmental concerns of the above types are certain to decrease the economic advantage of phosphogypsum stacking in the future.

Oftentimes the cost of sulfur for sulfuric acid production dictates that the use of nitric acid as an acidulant for the processing of such phosphate ore is economically advantageous. Nitric acid offers an advantage over sulfuric acid in that it not only solubilizes the phosphatic component of the ore, but also supplies a nitrogen-containing anion (nitrate, $NO_3^-$) which may itself be incorporated in a final fertilizer product. Nitric phosphate processes are quite highly developed and are extensively used in many of the European countries. In many instances, the production cost of nitric phosphate fertilizers is lower than equivalent sulfuric acid-based products; depending, of course, on such other factors as location, cost, transportation, crops, application, etc. More importantly, in respect to the teachings of the instant invention, it has long been recognized that nitric acid is an economically viable reagent for the winning of phosphate values from phosphate ores and, still more importantly, it effects such recovery without the concomitant production of huge amounts of waste by-products. Nitric acid is normally produced from air and water via intervention of an energy source (natural gas, coal, water electrolysis, etc.) as indicated by the following chemical equations.

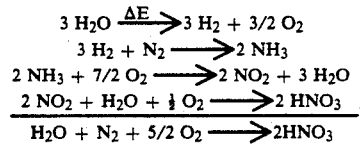

Hence, unlike sulfuric acid, the production of nitric acid is not tied to the availability of a valuable nonrenewable national mineral resource (sulfur). Although elemental sulfur reserves are reported to be large, they are not inexhaustible (nor is sour gas—a by-product of the petroleum industry). In fact, the high sulfuric acid and fertilizer prices of the early 1950s, the middle 1960s, and the early 1980s were attributed to sulfur shortages.

The current practice of recovering energy from the combustion of elemental sulfur during the production of sulfuric acid, and the subsequent use of this energy for the cogeneration of electricity or the evaporative concentrating of phosphoric acid, can be more than matched by the energy available from the combustion of ammonia to produce nitric acid. Also, from a thermodynamic view point, it must be recognized that nitric acid lies in a much more shallow energy well, with respect to the compounds from which it is ultimately produced, than does sulfuric acid.

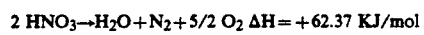

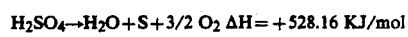

Hence, with the depletion of sulfur resources, sulfuric acid will become much less competitive with nitric acid for processing purposes.

The attack of nitric acid upon phosphate rock to produce soluble phosphate is depicted by the following chemical equation.

The chemistry is seen to be quite similar to that obtained when sulfuric acid is employed, except that the by-product phosphogypsum is replaced by calcium nitrate. At first glance, this might appear to be a highly advantageous modification since the employed nitric acid is now used not only to solubilize the rock phosphate but also to provide a highly valuable nitrogen fertilizer component—calcium nitrate. Since the nitric acid retains its pecuniary value when incorporated into a nitrogen fertilizer, the rock phosphate is acidulated essentially free of charge and no waste by-products are produced.

Unfortunately, however, in practice, the problems associated with this technology revolve around the fact that the calcium nitrate component of the acidulate is highly soluble and difficult to separate from the soluble phosphate. Hence, no economically viable procedure for the production of calcium-free fertilizer-grade phosphoric acid via nitric acid acidulation of phosphate rock exists.

The Nitric- or Nitro-Phosphate Industry of Europe has concerned itself primarily with the production of mixed N-P and N-P-K fertilizers along with a by-product nitrogen fertilizer, usually ammonium nitrate [A. V. Slack et al., Farm Chemicals 130, Nos. 4, 5, 6, and 7 (April, May, June, and July 1967); E. Aasum and T. Grundt, "Modern Nitrophosphate Technology, Based on the Norsk Hydro Process," Presented at the 182nd American Chemical Society National Meeting, Aug. 23-28, 1981, New York, N.Y.]. The principal procedure (Odda Process) involves the refrigeration, crystallization, and filtration of calcium nitrate from the acidulate in order to reduce the molar ratio Ca:PO4 to a value of one or less so that ammoniation and granulation may be conducted without reversion of the phosphate to an agronomically unavailable form. The ammoniation reactions depend upon the degree of calcium nitrate removal as indicated by the following equations.

$$H_3PO_4 + Ca(NO_3)_2 + 2\ NH_3 \rightarrow CaHPO_4 + 2\ NH_4NO_3$$

$$2\ H_3PO_4 + Ca(NO_3)_2 + 3\ NH_3 \rightarrow CaHPO_4 + (NH_4)H_2PO_4 + 2\ NH_4NO_3$$

As indicated, products of higher water soluble phosphate content require greater calcium nitrate removal so that the final ammoniation step results in the formation of larger quantities of water soluble ammonium phosphate relative to the simply "available" dicalcium phosphate. Agronomically, however, it is difficult to demonstrate that water soluble phosphates are superior to "available" phosphates as determined by the standard neutral ammonium citrate solubility method.

The by-product calcium nitrate, removed during the crystallization step, may be sold directly as nitrogen fertilizer or processed along with ammonia and carbon dioxide to ammonium nitrate and calcium carbonate.

$$Ca(NO_3)_2 + 2\ NH_3 + CO_2 + H_2O \rightarrow 2\ NH_4NO_3 + CaCO_3$$

A recent innovation by the European industry provides for the reaction of calcium nitrate with urea to produce a high-analysis urea calcium nitrate adduct, Ca(NO_3)_2.4(NH_2)_2CO (N. Robinson, G. Kongshaug, and E. Aasum, "Effect of Rock Impurities in Complex Fertilizer Production," presented at the 192nd National Americal Chemical Society Meeting, Anaheim, Calif., Sept. 7-12, 1986). In any event, the solubilizing nitric acid is incorporated in valuable fertilizer salts and no "throw away" waste by-products (other than siliceous gangue) are produced.

A recent variation of the nitrophosphate process which requires neither calcium nitrate or gangue removal, yet yields an almost completely water soluble N-P product, has been reported (Jack M. Sullivan, John H. Grinstead, Jr., Yong K. Kim, and Kjell R. Waerstad, Ind. Eng. Chem. Res. 27, No. 5, 851-857, 1988; also see U.S. Pat. No. 4,507,139, Sullivan, et al., Mar. 26, 1985, assigned to the assignee of the present invention). The process involves the acidulation of phosphate rock with niric acid followed by the addition of urea and granulation. Since no acid neutralization is employed, highly water soluble products are obtained even at relatively low nitric acid consumption. The normally poor hygroscopicity properties associated with incorporated calcium nitrate are ameliorated by its reaction with urea to form the adduct, $Ca(NO_3)_2.4(NH_2)_2CO$. Again, no "throw away" by-products are produced.

In spite of its extreme efficiency and the very sound thermodynamic, economic, resource conservation, and environmental rationale for its use, nitric acid is little used for the production of phosphatic fertilizers in the United States. There are a number of reasons for this: (1) the historical availability and relatively low cost of sulfuric acid made it the logical choice for the early processing of bones and phosphate ores; (2) the relatively late introduction of the Haber-Bosch-Ostwald technologies and the development of the fixed nitrogen and phosphate industries as separated entities further weakened the position of nitric acid for the processing of rock phosphate; (3) the development of the excellent phosphatic fertilizer, normal superphosphate, and its natural progression to triple superphosphate further enhanced the statue of sulfuric acid as the acid of choice for the processing of phosphate fertilizers; (4) the emphasis on more concentrated fertilizers and a resulting saving on shipping costs made the ability to leave diluent calcium in gypsum stacks a highly profitable procedure—hence the rapid and continuing switch to the production of ammonium phosphates; (5) the inability of the nitrophosphate industry to produce a high-analysis phosphatic fertilizer, comparable in phosphate content to sulfuric acid-based triple superphosphate (TSP), diammonium phosphate (DAP), or monoammonium phosphate (MAP), made nitric phosphates much less versatile for bulk blending with highly concentrated products from the nitrogen and potash industries—an operation which has become extremely popular in the United States; (6) the advent in some areas of the peculiar farming practice of applying phosphate fertilizer in the fall and nitrogen fertilizer in the spring (a strange procedure in view of the known ability of soils to render phosphates unavailable over time, and the willingness of farmers to forego interest on their investment for periods of up to six months) enhanced the requirements for fertilizers of high phosphate to nitrogen ratio; and (7) until fairly recent times, the apparent lack of concern for the esthetical and environmental implications of phosphogypsum stacking, and the lack of commitment by certain factions of industry to integrate nitrogen and phosphate facilities has resulted in little impetus for solving these problems associated with the production of by-product phosphogypsum.

Although such nitric phosphate fertilizers are characterized by a plethora of advantages over those produced by the acidulation of phosphate rock with sulfuric acid, they are still fraught with several distinct problems and disadvantages as produced by current prior-art practices. The present invention addresses the elimination of several of these significant drawbacks and disadvantages and provides for the nitric acid processing of phosphate rock to produce high-analysis phosphatic fertilizers whose available phosphate content may, depending upon the processing conditions, approach that of the sulfuric acid-based products such as TSP, DAP, and MAP, and hence products eminently suitable for bulk blending with other high-analysis nitrogen and potash salts to produce complete grade fertilizers, while at the same time consuming only about one-half of the acid equivalents normally associated with the production of sulfuric acid-based phosphate products. Further embodiments of this invention include the complete avoidance of the production of "throw away" by-products while producing a valuable nitrogen containing fertilizer salt, calcium nitrate, which may be granulated and sold, or processed to a higher grade nitrogen fertilizer.

BACKGROUND OF THE INVENTION

1. Field of the Invention

Although the nitric phosphate technologies described, supra, eliminate the problem of phosphogypsum production, they are generally incapable of producing high-analysis phosphatic fertilizers comparable in phosphate grade to TSP, DAP, and MAP, which are now widely accepted by American farmers and extensively used in bulk blending operations. The relatively low phosphate content of nitric phosphates results from the fact that some calcium is left in the products and part of the nitrogen is present in the bulky nitrate form.

In searching for a procedure to produce high-analysis phosphatic fertilizer by direct acidulation of phosphate rock with nitric acid, it is tempting to treat the rock phosphate with only enough acid to convert the phosphate component to agronomically available, but water insoluble, dicalcium phosphate and then separate the soluble calcium nitrate by simply leaching the mixture with water. As indicated by the following equations, dicalcium phosphate might be produced at one-half the acid consumption required for the production of monocalcium phosphate (the chief component of TSP).

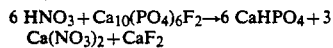

$6\ HNO_3 + Ca_{10}(PO_4)_6F_2 \rightarrow 6\ CaHPO_4 + 3\ Ca(NO_3)_2 + CaF_2$

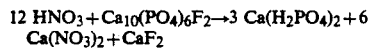

$12\ HNO_3 + Ca_{10}(PO_4)_6F_2 \rightarrow 3\ Ca(H_2PO_4)_2 + 6\ Ca(NO_3)_2 + CaF_2$ In practice, however, the second reaction, supra, proceeds quite readily while the first reaction is generally not observed (U.S. Pat. No. 4,113,842, NcCullough, et al., Sept. 12, 1978, assigned to the assignee of the present invention). When phosphate rock is acidulated with a quantity of acid sufficient only for the production of dicalcium phosphate, the acid is found to preferentially react to produce monocalcium phosphate and leave the remainder of the rock unacidulated. This phenomena results from the presence of low ($<0.05\%$) concentrations of uncomplexed fluoride ion in the mix and is explicable in terms of the phase diagram for the system $CaO-P_2O_5-HF-H_2O$ [T. D. Farr, G. Tarbutton, and H. T. Lewis, J. Phys. Chem. 66, 318, 1962], which shows no region of stability for $CaHPO_4$. The invariant point for the solid phases $Ca(H_2PO_4)_2 \cdot H_2O$, $Ca_{10}(PO_4)_6F_2$, and $CaF_2$ occurs at a pH of about 0.7.

Monocalcium phosphate and calcium fluoride precipitate at pH values below this value, while fluoroapatite and calcium fluoride precipitate at pH values above this value.

Fertilizer-grade dicalcium phosphate can be produced by addition of lime to merchant-grade (54% $P_2O_5$) phosphoric acid, from which considerable fluoride has been volatilized during concentration, provided enough impurity silica and aluminum are present (as is generally the case) to complex the remaining fluoride. This procedure, however, consumes about three times more acid than the stoichiometric quantity for direct acidulation. In addition, an input of lime is required. Hence, the production of fertilizer-grade dicalcium phosphate by this procedure is economically unattractive relative to the production of TSP, DAP, and MAP, which may be obtained with similar acid consumptions.

Even though dicalcium phosphate is not water soluble, it is recognized as a highly effective, completely available phosphatic fertilizer (*Superphosphate, Its History, Chemistry, and Manufacture*, Agricultural Research Service, U.S. Department of Agriculture, Washington, D.C., Issued December 1964, p 172). Although the debate over the relative merits of water soluble versus citrate soluble (available) fertilizers has continued for many years, it is now generally recognized that aqueous phosphate is highly reactive and, upon application to soil, quickly reverts to water insoluble forms by reaction with soil minerals. This process is referred to as "phosphate fixation" and generally results in phosphorus being an almost completely immobile plant nutrient, as opposed to nitrate which remains quite soluble in soil solution and may be leached to considerable depths below the point of application (E. C. Sample, R. J. Soper, and G. J. Racz, "Reactions of Phosphate Fertilizers in Soils," *The Role of Phosphorus in Agriculture*, ed. by F. E. Khasawneh, E. C. Sample, and E. J. Kamprath, published by American Society of Agronomy, Crop Science Society of America, Soil Science Society of America, Madison, Wis., 1980; "Water-Solubility, Safeguard or Sacred Cow?" *Phosphorus & Potassium* 160, 23-32, March-April, 1989).

The nature of the P fixation processes depend primarily upon the soil type. In the generally calcareous soils of the temperate zones the fixation process may be governed primarily by the equilibria within the calcium phosphate family of compounds—soluble phosphate being converted rapidly to dicalcium phosphate which is then slowly (due to its low solubility) converted to even more insoluble calcium phosphate salts, such as octacalcium phosphate, apatite, etc. In the generally acidic (calcium deficient) soils of the tropics and subtropics, water soluble phosphates may be almost instantaneously fixed as highly insoluble iron or aluminum phosphates.

The type of phosphate fixation may govern to some extent the plant response which is obtained when water soluble versus simply "available" phosphatic fertilizers are compared in soils that are deficient in phosphate. Hence, simply "available" phosphates often give better crop response when applied to the phosphate deficient acid soils of the tropics and subtropics, while water soluble phosphates often given better crop response when applied to phosphate deficient calcareous soils of the temperature zones. However, it should be noted that these results are strongly influenced by other factors such as the type of crop, the state of subdivision (granule size) of the fertilizer, placement of the fertilizer, and the presence of other nutrients.

It is emphasized that the above generalizations apply only to soils that are deficient in phosphorus. It must be realized that the buildup of residues from phosphate fertilization is a common feature of modern agriculture in developed countries. Indeed, there are vast areas of farmland within the United States in which crops show no response to applied phosphate fertilizer, regardless of its form (G. L. Terman, "Phosphate Sources: Agronomic Effectiveness in Relation to Chemical and Physical Properties," *Proceedings of the Fertilizer Society*, No. 123, 1971). It is further recognized that on the average, less than 20 percent of the phosphate applied to the soil during the year can be accounted for in the same years crop. Under such circumstances, the only apparent rationale for the application of phosphate fertilizer appears to be for maintenance purposes. There is no evidence to indicate that water soluble phosphatic fertilizers are more beneficial for this purpose than are simply available phosphates. In fact, some studies indicate that non-water soluble but citrate soluble materials, such as dicalcium phosphate, may react with the soil more slowly and so retain their individual availability longer (N. J. Barrow, "Evaluation and Utilization of Residual Phosphorus in Soils," *The Role of Phosphorus in Agriculture*, ed. by F. E. Khasawneh, E. C. Sample, and E. J. Kamprath, published by American Society of Agronomy, Crop Science Society of America, Soil Science Society of America, Madison, Wis., 1980).

2. Description of the Prior Art

Early recognition of the commercial possibility of producing dicalcium phosphate by pyrolysis of mixtures of soluble phosphate and calcium nitrate is taught in U.S. Pat. No. 2,134,013, Turrentine, Oct. 25, 1938. Turrentine reacted phosphate rock with volatile inorganic acids, such as hydrochloric acid, nitric acid, or oxides of nitrogen, in amounts sufficient to convert the contained phosphate to a water soluble form, and then heated the mixture to drive off a portion of the reacted acid and leave a product containing primarily calcium nitrate and dicalcium phosphate.

In the practice of the teachings of U.S. Pat. No. 2,211,918, Turrentine, Aug. 20, 1940, there is employed a similar procedure to produce fertilizers containing double salts of dicalcium phosphate with calcium nitrate or calcium chloride. These products were claimed to be less hygroscopic and to contain more water soluble phosphate than simple mixtures of the calcium nitrate or chloride with dicalcium phosphate.

During the height of the sulfur shortage of the early 1950s, Turrentine expounded the use of this technology to prevent the then perceived rapid depletion of brimstone reserves (*Chemical and Engineering News* 29, (34), 3454–56, Aug. 20, 1951). However, it should be noted that in each case the proposed products were mixed N-P or Cl-P materials, no provision being made for the separation of the phosphate from the nitrate or chloride salts.

In Austrian Patent No. 176,219, Joham, Sept. 25, 1953 there is described the reaction of nitric acid with phosphate rock to produce a liquid reaction mixture which is subsequently evaporated and dried at 200° C. to provide a solid material which was dispersed in water and filtered to produce a concentrated calcium nitrate solution and a solid product containing 34.3 percent $P_2O_5$, of which 88 percent was citrate soluble. A variation of the procedure involved the addition of lime to the initially produced acidulate to bring the pH to 1.4 and to precipitate $CaF_2$, which was then filtered along with the gangue. Subsequent treatment of the filtrate, as described above, resulted in a solid product containing 44.8 percent $P_2O_5$, of which 89 percent was citrate soluble. It should be noted, however, that this procedure probably also results in partial reversion of phosphate to fluorapatite as indicated by the phase equilibria of Farr, et al., supra. Furthermore, neither variation of the procedure provides for a completely citrate soluble phosphate product, or for the recovery of the excess nitric acid liberated during the evaporation process.

U.S. Pat. No. 2,753,252, Barnes, July 3, 1956, it is proposed that a substantially completely citrate soluble phosphatic product may be prepared by reacting phosphate rock with nitric acid, filtering the gangue, evaporating free water from the acidulate by boiling, heating the resulting residue to about 180° C. to about 190° C. to expel all water of hydration, dispersing the residue in anhydrous ammonia to dissolve the calcium nitrate, and finally filtering the mixture to obtain the phosphate product and a filtrate containing anhydrous ammonia and calcium nitrate. The filtrate is further processed with water and carbon dioxide to produce an ammonium nitrate solution and by-product calcium carbonate. Barnes claims a 95.8 percent recovery of the $P_2O_5$ initially present in the rock, but makes no provision for the recovery of nitric acid liberated during the heating processes.

SUMMARY OF THE INVENTION

The present invention relates to the discovery of a new and novel process for treating phosphate ore with nitric acid to produce high-analysis phosphatic fertilizers, along with a nitrogen fertilizer, while avoiding the coproduction of worthless by-products which serve no useful purpose and present formidable storage and pollution problems. The procedure comprising digesting phosphate rock with enough nitric acid to yield the desired degree of phosphate availability in the final product, removing the siliceous gangue (optional step), heating the resulting acidulate to drive off approximately one-half of the initially reacted nitric acid, recovering the expelled nitric acid for recycle to rock acidulation or nitrogen fertilizer production, leaching the solid residue with water to remove by-product calcium nitrate, drying and processing the remaining solid residue to a high-analysis phosphatic fertilizer, and processing the aqueous calcium nitrate filtrate to a suitable nitrogen fertilizer.

The approximate chemistry associated with the acidulation and pyrolysis steps of the instant process is indicated by the following equations.

Acidulation $$12 \text{ HNO}_3 + \text{Ca}_{10}(\text{PO}_4)_6\text{F}_2 \longrightarrow$$

$$3 \text{ Ca(H}_2\text{PO}_4)_2 + 6 \text{ Ca(NO}_3)_2 + \text{CaF}_2$$

Pyrolysis $$3 \text{ Ca(H}_2\text{PO}_4)_2 + 6 \text{ Ca(NO}_3)_2 \longrightarrow$$

-continued

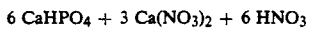
$$6\ CaHPO_4 + 3\ Ca(NO_3)_2 + 6\ HNO_3 \uparrow$$

Nitric acid reacts with phosphate rock to preferentially produce water soluble monocalcium phosphate which, upon pyrolysis, reacts with calcium nitrate to produce dicalcium phosphate and liberate one-half of the initially consumed nitric acid. This expelled nitric acid may be recaptured in the absorption column of a conventional nitric acid plant or in a custom built absorption system. The phosphate products, containing various amounts of dicalcium phosphate, depending upon the initial molar ratio of $HNO_3$:CaO employed in the acidulation step, will generally be in the form of a fine nonhygroscopic powder, which may be used "as is" or granulated with the aid of a binder such as ammonium phosphate, urea, or some other material known to those skilled in the art of granulation. As will be appreciated by those skilled in this art, conventional reference notations to moles of CaO as used herein is, of course, the full equivalent to moles of Ca. The aqueous calcium nitrate stream may be concentrated by evaporation, reacted with four moles of urea, and granulated to produce urea calcium nitrate, $Ca(NO_3)_2\ 4(NH_2)_2CO$ (34% N), or it may be reacted with ammonia and carbon dioxide to produce ammonium nitrate and lime, or finally, it may be simply granulated alone or in combination with ammonium nitrate to produce relatively low-grade nitrogen fertilizers.

OBJECTS OF THE INVENTION

A principal object of the present invention is to provide an economically, conservationally, and environmentally sound procedure for processing phosphate ore into high-analysis phosphate and nitrogen fertilizers, while avoiding the coproduction of worthless by-products which only act to cause storage and pollution problems for the fertilizer industry and the nation.

A further object of the present invention is to provide a procedure for producing high-analysis phosphatic and nitrogen fertilizers using only about one-half of the acid equivalents normally required when sulfuric acid is employed.

A still further object of the present invention is to provide a fully available phosphatic fertilizer whose phosphate content is high enough to make it eminently suitable for bulk blending with high-analysis nitrogen and potash products to produce complete three-component $(N+P_2O_5+K_2O)$ fertilizers.

Another object of the instant invention is to provide a procedure for producing less than completely citrate soluble phosphatic fertilizers, whose low solubility make them particularly useful for application to acid soils (such as those of the tropics and subtropics).

DESCRIPTION OF THE DRAWING

The present invention, together with further objects and advantages thereof, will be better understood from a consideration of the following description taken in connection with the accompanying drawing in which:

The FIGURE is a flow diagram of the instant invention process and the preferred embodiments thereof.

Ground or unground phosphate rock and nitric acid from sources not shown are fed via lines 1 and 2, respectively, into reactor 3, where acidulation is allowed to proceed at temperatures of about 60° C. to about 100° C. for a period of about 20 minutes to 2 hours. In a first alternative embodiment of the present invention, the acidulate is then led via line 4 to separation device 5 which conveniently may be a hydrocyclone, a filter, a centrifuge, or some other like device, wherein the solid siliceous gangue is separated to storage 6 via line 7. This gangue separation step is optional, merely providing a means for producing a more concentrated phosphate product. Depending on whether this first alternative embodiment is or is not utilized, the liquid acidulate in reactor 4 or separation device 5, respectively, is then led via line 8 to furnace 9 wherein gaseous nitric acid and water are expelled by heating at temperatures of 170° C. to about 230° C. for a period of 2 to 7 hours. The liberated nitric acid and water vapor pass via line 10 to nitrogen oxide absorption column 11 wherein the nitric acid is concentrated by further addition via line 13 of nitrogen oxide, from a source not shown. Also not shown, air and/or aqueous media such as, process water may likewise be added to absorption column 11. As is also shown, the nitrogen oxide vapors formed in reactor 3 are also introduced into column 11 via line 12. The resulting regenerated nitric acid is then passed via line 14 to reactor 3 wherein it is further utilized to acidulate additional amounts of phosphate rock. The solid residue from furnace 9 is led via line 15 to leach filter 16, wherein it is dispersed in water introduced from a source not shown via line 17 and agitated to allow the dissolution of entrained calcium nitrate and subsequently filtered. The resulting filter cake is washed with water (not shown), introduced to granulator 18 via line 19 and then sent via line 20 and to storage 21. The resulting calcium nitrate filtrate solution is led via line 22 to storage means 23 for later processing as a nitrogen fertilizer.

DESCRIPTION OF THE PREFERRED EMBODIMENT

The practice of the present invention can result in the production of a wide variety of phosphate and nitrogen products depending upon specific agronomic properties, grade requirements, acid consumption limitations, intermediate chemicals availability, storage properties, and handling properties required by the producer. In general, the chemical and agronomic properties oif the produced phosphatic product are governed by the molar ratio $HNO_3$:CaO employed in the phosphate rock acidulation step. Hence, products containing essentially any degree of $P_2O_5$ availability (neutral ammonium citrate solubility) may be obtained. Generally, fully available phosphate products will be employed for conventional farming of calcareous soils where the maintenance of adequate levels of available phosphate are required. Less than fully available products may be employed with certain acidic soils, cropping situations, or nutrient enhancement programs.

Although the molar $HNO_3$:CaO acidulation ratio determines the percentage of available $P_2O_5$ in the final phosphatic products, it is not indicative of the quantity of nitric acid consumed in the process. The actual nitric acid consumption is about one-half the amount indicated by the initial acidulation ratio and is determined by the "effective acidulation ratio." The "effective acidulation ratio" as used herein means the ratio of the initial moles of nitric acid, which are not recovered in the absorption system during the acidulation and pyrolysis steps, to the initial moles of CaO present in the phosphate rock.

The nature (as opposed to quantity) of the resulting aqueous calcium nitrate by-product is largely unaffected by the degree of acidulation. The final disposition of the calcium nitrate stream may depend upon the availability of other chemical intermediates. For instance, if ammonia and carbon dioxide are available, as is generally the case when an ammonia plant location is nearby, then such calcium nitrate may be processed to ammonium nitrate and lime. On the other hand, if urea is available, then the preferred product might be "cal urea," $Ca(NO_3)_2 \cdot 4(NH_2)_2CO$. Finally, if no suitable chemical intermediates are available, as when imported $HNO_3$ is employed, then such calcium nitrate may be sold as an aqueous nitrogen fertilizer or granulated alone or in combination with ammonium nitrate to produce a solid nitrogen product.

EXAMPLES

In order that those skilled in the art may better understand how the present invention can be practiced, the following examples are given by way of illustration but not necessarily by way of limitation.

The particular nitric acid employed in the tests herein described and illustrated was reagent grade and contained 69.75 percent $HNO_3$ (density: 1.404 g/ml). The ground phosphate rock was of Central Florida origin, and had the following composition: 30.7 percent $P_2O_5$, 32.8 percent Ca (45.89% CaO equivalent), 0.78 percent Fe, 0.75 percent Al, 0.17 percent Mg, 3.91 percent F, 3.71 percent Si, and 0.02 percent N. It will, of course, be appreciated by those skilled in the art that acids and rocks from other specific sources will result in different assays than those above. Accordingly, tabulated below are typical assay ranges which can be expected from such materials.

| Typical Phosphate Rock Assays, % | | | | | | |
|---|---|---|---|---|---|---|
| $P_2O_5$ | Ca | Fe | AL | Mg | Si | N |
| 28–36 | 32–36 | 0.5–1.8 | 0.3–0.9 | 0.02–0.4 | 3.0–5.0 | 0.01–0.03 |

The experiments were conducted using an all Teflon reaction system. The precision machined cylindrical Teflon reactor had external dimensions of 7.6 cm O.D.×13.8 cm (including cap) and internal dimensions of 5.7 cm I.D.×9.3 cm. The reactor was drilled 2.5 cm below the top to allow the entrance of a 10 mm O.D.×6 mm I.D. Teflon tube used to purge the reactor with helium during the digestion and pyrolysis steps. Once inside the reactor, the tube was directed downward in an L-shape to ensure the complete expulsion of volatile gases. The reactor was compression sealed at the top with a precision ground Teflon cap via means of an end plate-four bolt-wing nut compression assembly. The reactor cap was drilled to allow the exit of the helium purge gas through a 12 mm O.D.×10 mm I.D. Teflon exit tube. The exit tube passed to a series of two rubber stopper capped plastic bottles where the purge gas was allowed to bubble through a dilute NaOH solution for recovery of nitric oxides, nitric acid, and volatile fluorides. The exit gas then passed to a soap bubble flowmeter where the flow rate was periodically measured. The reactor was heated by means of a glass wool packed 1000 ml spherical heating mantle. The Teflon exit tube was lagged with heating tape to maintain temperatures above 100° C. up to the point where the tube entered the first NaOH trap.

The experiments were conducted as follows. The Teflon exit tube, lagged with heating tape, was heated to a temperature of about 110° C. One hundred fifty grams of 1.5M NaOH was added to the first trap and fifty grams of 1.5M NaOH to the second trap. The required weight of phosphate rock was added to the preweighed Teflon reactor. The required weight of nitric acid was then pipetted into the reactor to start the acidulation reaction. The reactor was immediately closed and the helium purge rate set at about 85 ml/min. The temperature of the reactor was maintained at about 60° C. to about 100° C. for a period of one hour to allow completion of the acidulation reaction. The reactor temperature was then increased to about 170° C. to about 230° C. for a period of about 3 to about 7 hours to allow completion of the dicalcium phosphate producing reaction and the liberation of the excess nitric acid. Heating was then discontinued and the reaction system allowed to cool to room temperature. The NaOH trap solutions were combined and subjected to suitable dilutions for subsequent ion chromatographic analysis. The Teflon reactor and contents were weighed to determine the quantity of dried pyrolyzate. Approximately 50 ml of water was added to the pyrolyzate and the mixture allowed to stand for several hours in order to dissolve the calcium nitrate component. Another approximately 50 ml portion of water was used to transfer the adhering solid portions of the mixture into a weighed sintered glass filter. After filtration, the solid product was washed with two 50 ml batches of water, oven dried, and weighed. The filtrate-washings mixture was weighed and suitably diluted for subsequent ion chromatographic analysis.

Chemical analyses of the solid products were conducted using standard AOAC procedures. X-ray diffraction analysis of the solids was performed with a Scintag PAD V Automated X-ray Diffraction System. NOTE: Any references made herein to materials and/or apparatus which are identified by means of trademarks, trade names, etc., are included solely for the convenience of the reader and are not intended as or to be construed an endorsement of said materials and/or apparatus. Chemical analysis of the filtrate-washings solution and the NaOH trap solution for Ca, $P_2O_5$, $NO_3$, $NO_2$, and F was conducted using a Dionex Model 2210 Ion Chromatograph. The observed quantities of nitrate and nitrite were combined to determine the quantity of recoverable nitrate.

Tables I and II, infra, are provided in order to simplify the discussion of the individual Examples I-VII and VIII-XIII, respectively. Said tables give an overall mass balance for each experiment and include material inputs and outputs, chemical analysis of inputs and outputs, masses of chemical inputs and outputs, differences between masses of chemical inputs and outputs, and finally specific comments concerning the individual products.

TABLE I

Mass Balance for Production of High-Analysis Phosphatic Fertilizers and Calcium Nitrate via Nitric Acid Acidulation and Pyrolysis of Phosphate Rock at Various Acidulation Ratios, $HNO_3$:CaO

| Example No. | I | II | III | IV | V | VI | VII |
|---|---|---|---|---|---|---|---|

TABLE I-continued

Material Inputs, Grams
(Phosphate rock and nitric acid)

| | | | | | | | |
|---|---|---|---|---|---|---|---|
| HNO₃:CaO: | 0.393 | 0.589 | 0.786 | 0.984 | 1.180 | 1.377 | 1.574 |
| HNO₃: | 14.02 | 14.02 | 14.02 | 35.11 | 35.11 | 35.11 | 35.11 |
| Rock | 48.28 | 32.19 | 24.14 | 48.28 | 40.24 | 34.49 | 30.18 |

Material Outputs, Grams
(Pyrolyzates, products, NaOH solutions, and filtrates)

| | | | | | | | |
|---|---|---|---|---|---|---|---|
| Pyrolyzate: | 51.8 | 35.8 | 27.6 | 57.9 | 49.6 | 44.0 | 39.9 |
| Product: | 45.19 | 29.38 | 21.41 | 41.35 | 33.55 | 27.66 | 23.57 |
| NaOH Sol: | 275.32 | 275.61 | 277.89 | 297.86 | 286.67 | 293.38 | 287.67 |
| Filtrate: | 225.79 | 170.66 | 265.28 | 230.88 | 225.97 | 234.05 | 190.19 |

Chemical Analysis, Inputs, Wt %
(Phosphate rock and nitric acid)

| | Rock | HNO₃ |
|---|---|---|
| Ca | 32.8 | — |
| P₂O₅ | 30.7 | — |
| Fe | 0.78 | — |
| Al | 0.75 | — |
| Mg | 0.17 | — |
| F | 3.91 | — |
| Si | 3.71 | — |
| NO₃ | 0.09 | 68.63 |

Chemical Analysis, Outputs, Wt %
(Solid products, filtrates, and NaOH solutions)

| Example No. | I | II | III | IV | V | VI | VII |
|---|---|---|---|---|---|---|---|
| | | | Solid Products | | | | |
| HNO₃:CaO: | 0.393 | 0.589 | 0.786 | 0.984 | 1.180 | 1.377 | 1.574 |
| Ca | 30.7 | 30.2 | 28.7 | 27.7 | 26.9 | 25.6 | 24.4 |
| P₂O₅ | 32.6 | 33.5 | 34.2 | 35.4 | 36.5 | 37.7 | 38.4 |
| Fe | 0.86 | 0.90 | 0.90 | 0.95 | 0.95 | 1.01 | 1.06 |
| Al | 0.79 | 0.84 | 0.80 | 0.84 | 0.85 | 0.91 | 0.96 |
| Mg | 0.18 | 0.18 | 0.19 | 0.20 | 0.20 | 0.21 | 0.22 |
| F | 4.02 | 3.99 | 3.81 | 3.74 | 3.51 | 3.56 | 3.31 |
| Si | 3.49 | 3.85 | 3.65 | 3.59 | 3.74 | 3.92 | 3.94 |
| NO₃ | 1.06 | 1.41 | 1.37 | 1.95 | 1.99 | 2.21 | 2.61 |
| C.I. P₂O₅ | 23.6 | 21.6 | 20.6 | 16.5 | 14.1 | 10.1 | 7.51 |
| W.S. P₂O₅ | 0.61 | 0.73 | 0.73 | 0.74 | 0.75 | 1.00 | 0.81 |
| Avail. P₂O₅ | 9.00 | 11.9 | 13.6 | 18.9 | 22.4 | 27.6 | 30.9 |
| % Avail. P₂O₅ | 27.6 | 35.5 | 39.8 | 53.4 | 61.4 | 73.2 | 80.5 |
| | | | Filtrate | | | | |
| Ca | 0.721 | 0.931 | 0.584 | 1.789 | 1.789 | 1.775 | 2.141 |
| P₂O₅ | 0.0204 | 0.0237 | 0.0178 | 0.0223 | 0.0261 | 0.277 | 0.0243 |
| NO₃ | 2.13 | 2.81 | 1.69 | 5.34 | 5.16 | 5.16 | 6.25 |
| | | | NaOH Solution | | | | |
| NO₃ | 1.34 | 1.40 | 1.56 | 3.37 | 3.69 | 3.50 | 3.71 |
| NO₂ | 0.088 | 0.067 | 0.062 | 0.163 | 0.152 | 0.162 | 0.149 |
| F | 0.0354 | 0.0345 | 0.0435 | 0.113 | 0.125 | 0.116 | 0.131 |

Chemical Inputs, Grams
(Phosphate rock and nitric acid)

| | | | Nitric Acid | | | | |
|---|---|---|---|---|---|---|---|
| HNO₃:CaO | 0.393 | 0.589 | 0.786 | 0.984 | 1.180 | 1.377 | 1.574 |
| HNO₃(NO₃) | 9.62 | 9.62 | 9.62 | 24.09 | 24.09 | 24.09 | 24.09 |
| | | | Rock | | | | |
| Ca | 15.84 | 10.56 | 7.92 | 15.84 | 13.20 | 11.31 | 9.90 |
| P₂O₅ | 14.82 | 9.88 | 7.41 | 14.82 | 12.35 | 10.59 | 9.27 |
| Fe | 0.38 | 0.25 | 0.19 | 0.38 | 0.31 | 0.27 | 0.24 |
| Al | 0.36 | 0.24 | 0.18 | 0.36 | 0.30 | 0.26 | 0.23 |
| Mg | 0.08 | 0.05 | 0.04 | 0.08 | 0.07 | 0.06 | 0.05 |
| F | 1.89 | 1.26 | 0.94 | 1.89 | 1.57 | 1.35 | 1.18 |
| Si | 1.79 | 1.19 | 0.90 | 1.79 | 1.49 | 1.28 | 1.12 |
| NO₃ | 0.04 | 0.03 | 0.02 | 0.04 | 0.04 | 0.03 | 0.03 |

Chemical Outputs, Grams
(Solid Products, Filtrates, and NaOH Solutions)

| Example No. | I | II | III | IV | V | VI | VII |
|---|---|---|---|---|---|---|---|
| | | | Solid Products | | | | |
| Ca | 13.87 | 8.87 | 6.14 | 11.45 | 9.02 | 7.08 | 5.95 |
| P₂O₅ | 14.73 | 9.84 | 7.32 | 14.64 | 12.25 | 10.43 | 9.37 |
| Fe | 0.39 | 0.26 | 0.19 | 0.39 | 0.32 | 0.28 | 0.26 |
| Al | 0.36 | 0.25 | 0.17 | 0.35 | 0.29 | 0.25 | 0.23 |
| Mg | 0.08 | 0.05 | 0.04 | 0.08 | 0.07 | 0.06 | 0.05 |
| F | 1.82 | 1.17 | 0.82 | 1.55 | 1.18 | 0.98 | 0.81 |
| Si | 1.58 | 1.13 | 0.78 | 1.48 | 1.25 | 1.08 | 0.96 |
| NO₃ | 0.48 | 0.41 | 0.29 | 0.81 | 0.66 | 0.61 | 0.64 |
| | | | Filtrates | | | | |
| Ca | 1.63 | 1.59 | 1.55 | 4.13 | 4.04 | 4.15 | 4.07 |

TABLE I-continued

| | | | | | | | |
|---|---|---|---|---|---|---|---|
| $P_2O_5$ | 0.05 | 0.04 | 0.05 | 0.05 | 0.06 | 0.06 | 0.05 |
| $NO_3$ | 4.81 | 4.80 | 4.48 | 12.33 | 11.66 | 12.08 | 11.89 |
| NaOH Solutions | | | | | | | |
| $NO_3$ | 4.02 | 4.11 | 4.57 | 10.69 | 11.17 | 10.91 | 11.25 |
| F | 0.10 | 0.10 | 0.12 | 0.34 | 0.36 | 0.34 | 0.38 |

Differences, Grams

| Example No. | I | II | III | IV | V | VI | VII |
|---|---|---|---|---|---|---|---|
| Ca | 0.34 | 0.10 | 0.23 | 0.26 | 0.14 | 0.08 | −0.12 |
| $P_2O_5$ | 0.04 | 0.00 | 0.04 | 0.13 | 0.04 | 0.10 | −0.15 |
| Fe | −0.01 | −0.01 | 0.00 | −0.01 | −0.01 | −0.01 | −0.02 |
| Al | 0.00 | −0.01 | 0.01 | 0.01 | 0.01 | 0.01 | 0.00 |
| Mg | 0.00 | 0.00 | 0.00 | 0.00 | 0.00 | 0.00 | 0.00 |
| F | −0.03 | −0.01 | 0.00 | 0.00 | 0.03 | 0.03 | −0.01 |
| Si | 0.21 | 0.05 | 0.12 | 0.31 | 0.24 | 0.20 | 0.16 |
| $NO_3$ | 0.35 | 0.33 | 0.30 | 0.30 | 0.64 | 0.52 | 0.34 |

Comments
Effective acidulation ratio ($HNO_3$:CaO):
  0.229  0.337  0.412  0.547  0.633  0.753  0.838
Percent $P_2O_5$ as available $P_2O_5$:
  27.6  35.5  39.8  53.4  61.4  73.2  80.5
Percent of initial $P_2O_5$ recovered in solid products:
  99.4  99.6  98.8  98.7  99.2  98.5  101.1
Percent of initial calcium recovered in solid products:
  87.5  84.0  77.5  72.3  68.3  62.6  60.1
Molar ratio Ca:$PO_4$ in products:
  1.67  1.60  1.49  1.38  1.30  1.20  1.12
Percent of initial fluorine remaining in solid products:
  96.3  92.9  87.2  82.0  75.2  72.6  68.6
Percent of initial nitric acid unrecovered:
  3.63  3.43  3.12  1.24  2.65  2.15  1.41
Molar ratio $NO_3$:Ca in filtrate
  1.91  1.93  1.87  1.93  1.87  1.88  1.89

TABLE II

Mass Balance for Production of High-Analysis Phosphatic Fertilizers and Calcium Nitrate via Nitric Acid Acidulation and Pyrolysis of Phosphate Rock at Various Acidulation Ratios, $HNO_3$:CaO

| Example No. | VIII | IX | X | XI | XII | XIII |
|---|---|---|---|---|---|---|
| Material Inputs, Grams (Phosphate rock and nitric acid) | | | | | | |
| $HNO_3$:CaO: | 1.770 | 1.967 | 1.967 | 2.164 | 2.164 | 2.164 |
| $HNO_3$: | 35.11 | 35.11 | 35.11 | 35.11 | 35.11 | 35.11 |
| Rock | 26.83 | 24.14 | 24.14 | 21.95 | 21.95 | 21.95 |
| Material Outputs, Grams (Pyrolyzates, Products, NaOH solutions, and filtrates) | | | | | | |
| Pyrolyzate: | 36.0 | 33.9 | 33.3 | 30.9 | 31.3 | 30.8 |
| Product: | 20.05 | 17.06 | 17.79 | 15.66 | 14.69 | 15.50 |
| NaOH Sol: | 301.56 | 248.64 | 261.02 | 267.63 | 251.70 | 290.91 |
| Filtrate: | 194.52 | 195.82 | 198.4 | 167.09 | 210.55 | 230.67 |

Chemical Analysis, Inputs, Wt % (Phosphate rock and nitric acid)

| | Rock | $HNO_3$ |
|---|---|---|
| Ca | 32.8 | — |
| $P_2O_5$ | 30.7 | — |
| Fe | 0.78 | — |
| Al | 0.75 | — |
| Mg | 0.17 | — |
| F | 3.91 | — |
| Si | 3.71 | — |
| $NO_3$ | 0.09 | 68.63 |

Chemical Analysis, Outputs, Wt % (Solid Products, filtrates, and NaOH solutions)

| Example No. | VIII | IX | X | XI | XII | XIII |
|---|---|---|---|---|---|---|
| Solid Products | | | | | | |
| $HNO_3$:CaO: | 1.770 | 1.967 | 1.967 | 2.164 | 2.164 | 2.164 |
| Ca | 23.5 | 21.7 | 22.0 | 20.9 | 20.8 | 21.8 |
| $P_2O_5$ | 39.9 | 40.9 | 40.5 | 41.7 | 40.6 | 40.9 |
| Fe | 1.16 | 1.18 | 1.10 | 1.16 | 1.21 | 1.12 |
| Al | 1.05 | 1.12 | 0.97 | 1.02 | 1.06 | 1.05 |
| Mg | 0.23 | 0.23 | 0.22 | 0.23 | 0.21 | 0.21 |
| F | 3.19 | 3.22 | 3.02 | 2.84 | 2.99 | 3.03 |
| Si | 4.02 | 4.05 | 3.55 | 3.98 | 3.85 | 4.28 |
| $NO_3$ | 2.61 | 3.01 | 2.88 | 3.72 | 2.61 | 2.57 |
| C.I. $P_2O_5$ | 3.64 | 1.41 | 1.50 | 0.53 | 0.15 | 0.30 |
| W.S. $P_2O_5$ | 0.73 | 1.12 | 1.07 | 0.82 | 1.61 | 1.58 |
| Avail. $P_2O_5$ | 36.3 | 39.5 | 39.0 | 41.2 | 40.5 | 40.6 |
| % Avail. $P_2O_5$ | 91.0 | 96.6 | 96.3 | 98.8 | 99.8 | 99.3 |
| Filtrate | | | | | | |
| Ca | 2.101 | 2.123 | 1.971 | 2.340 | 1.908 | 1.665 |
| $P_2O_5$ | 0.0226 | 0.0386 | 0.0277 | 0.0242 | 0.0608 | 0.0406 |
| $NO_3$ | 6.07 | 6.30 | 5.83 | 6.89 | 5.48 | 4.69 |
| NaOH Solution | | | | | | |
| $NO_3$ | 3.52 | 4.14 | 4.29 | 4.07 | 4.37 | 4.03 |
| $NO_2$ | 0.128 | 0.158 | 0.141 | 0.108 | 0.100 | 0.108 |
| F | 0.126 | 0.142 | 0.143 | 0.118 | 0.146 | 0.120 |

Chemical Inputs, Grams (Phosphate rock and nitric acid)

| | | | | | | |
|---|---|---|---|---|---|---|
| Nitric Acid | | | | | | |
| $HNO_3$:CaO | 1.770 | 1.967 | 1.967 | 2.164 | 2.164 | 2.164 |
| $HNO_3$($NO_3$) | 24.09 | 24.09 | 24.09 | 24.09 | 24.09 | 24.09 |
| Rock | | | | | | |
| Ca | 8.80 | 7.92 | 7.92 | 7.20 | 7.20 | 7.20 |
| $P_2O_5$ | 8.24 | 7.41 | 7.41 | 6.74 | 6.74 | 6.74 |
| Fe | 0.21 | 0.19 | 0.19 | 0.17 | 0.17 | 0.17 |
| Al | 0.20 | 0.18 | 0.18 | 0.16 | 0.16 | 0.16 |
| Mg | 0.05 | 0.04 | 0.04 | 0.04 | 0.04 | 0.04 |
| F | 1.05 | 0.94 | 0.94 | 0.86 | 0.86 | 0.86 |
| Si | 1.00 | 0.90 | 0.90 | 0.81 | 0.81 | 0.81 |
| $NO_3$ | 0.02 | 0.02 | 0.02 | 0.02 | 0.02 | 0.02 |

Chemical Outputs, Grams (Solid Products, Filtrates, and NaOH Solutions)

| Example No. | VIII | IX | X | XI | XII | XIII |
|---|---|---|---|---|---|---|
| Solid Products | | | | | | |
| Ca | 4.71 | 3.70 | 3.91 | 3.27 | 3.06 | 3.38 |
| $P_2O_5$ | 8.00 | 6.98 | 7.20 | 6.53 | 5.96 | 6.34 |
| Fe | 0.23 | 0.20 | 0.20 | 0.18 | 0.18 | 0.17 |
| Al | 0.21 | 0.19 | 0.17 | 0.16 | 0.16 | 0.16 |
| Mg | 0.05 | 0.04 | 0.04 | 0.04 | 0.03 | 0.03 |
| F | 0.64 | 0.55 | 0.54 | 0.44 | 0.44 | 0.47 |
| Si | 0.81 | 0.69 | 0.63 | 0.62 | 0.57 | 0.66 |
| $NO_3$ | 0.52 | 0.51 | 0.51 | 0.58 | 0.38 | 0.40 |
| Filtrates | | | | | | |

TABLE II-continued

| | | | | | | |
|---|---|---|---|---|---|---|
| Ca | 4.09 | 4.16 | 3.91 | 3.91 | 4.02 | 3.84 |
| $P_2O_5$ | 0.04 | 0.08 | 0.05 | 0.04 | 0.13 | 0.09 |
| $NO_3$ | 11.81 | 12.34 | 11.57 | 11.51 | 11.54 | 10.81 |
| NaOH Solutions | | | | | | |
| $NO_3$ | 11.14 | 10.82 | 11.69 | 11.28 | 11.34 | 12.15 |
| F | 0.38 | 0.35 | 0.37 | 0.32 | 0.37 | 0.35 |
| Differences, Grams | | | | | | |
| Ca | 0.00 | 0.06 | 0.10 | 0.02 | 0.12 | −0.02 |
| $P_2O_5$ | 0.20 | 0.35 | 0.16 | 0.17 | 0.65 | 0.31 |
| Fe | −0.02 | −0.01 | −0.01 | −0.01 | −0.01 | 0.00 |
| Al | −0.01 | −0.01 | 0.01 | 0.00 | 0.00 | 0.00 |
| Mg | 0.00 | 0.00 | 0.00 | 0.00 | 0.01 | 0.01 |
| F | 0.03 | 0.04 | 0.03 | 0.10 | 0.05 | 0.04 |
| Si | 0.19 | 0.21 | 0.27 | 0.19 | 0.24 | 0.15 |
| $NO_3$ | 0.64 | 0.44 | 0.34 | 0.74 | 0.85 | 0.75 |

Comments
Effective acidulation ratio ($HNO_3$:CaO):
  0.951  1.083  1.012  1.150  1.144  1.072
Percent $P_2O_5$ as available $P_2O_5$:
  91.0  96.6  96.3  98.9  99.8  99.3
Percent of initial $P_2O_5$ recovered in solid products:
  97.1  94.2  97.2  96.9  88.4  94.1
Percent of initial calcium recovered in solid products:
  53.5  46.7  49.4  45.4  42.5  46.9
Molar ratio Ca:$PO_4$ in products:
  1.04  0.94  0.96  0.89  0.90  0.94
Percent of initial fluorine remaining in solid products:
  61.0  58.5  57.4  51.2  51.2  54.7
Percent of initial nitric acid unrecovered:
  2.66  1.83  1.41  3.07  3.53  3.11
Molar ratio $NO_3$:Ca in filtrate
  1.87  1.92  1.91  1.90  1.86  1.82

EXAMPLE I

Nitric acid, 14.02 g, was added to 48.28 g of phosphate rock to provide an initial molar $HNO_3$:CaO acidulation ratio of 0.393. The acidulation reaction was allowed to proceed for a period of 1 hour at a temperature of 60° C. to about 80° C. The acidulate was then heated to 210° C. and maintained at this temperature for a period of 6 hours. The resulting pyrolyzate was leached with water, filtered, and dried to give 45.19 g of solid product containing 32.6 percent total $P_2O_5$ and 9.00 percent available $P_2O_5$. X-ray examination showed the solid product to contain apatite as the major phase with dicalcium phosphate and quartz as minor phases. The NaOH trap solution contained 4.02 g of the initial 9.62 g of $NO_3$ input as nitric acid. Hence, the effective molar $HNO_3$:CaO acidulation ratio was 0.229. The molar ratio of $NO_3$:Ca in the filtrate was 1.91, indicative of the presence of $Ca(NO_3)_2$. Other pertinent information concerning this test may be gleaned from Table I, supra.

EXAMPLE II

Nitric acid, 14.02 g, was added to 32.19 g of phosphate rock to provide an initial acidulation ratio, $HNO_3$:CaO, of 0.589. The acidulation was allowed to proceed at temperatures of 60° C. to about 80° C. for a period of 1 hour. The temperature was increased to 180° C. to about 200° C. and the reaction continued for a period of 5 hours. The resulting pyrolyzate was leached with water, filtered, and dried to give 29.38 g of solid product containing 33.5 percent total $P_2O_5$ and 11.9 percent available $P_2O_5$. X-ray examination showed the product to contain apatite as the major phase and dicalcium phosphate and quartz as minor phases. The NaOH trap solution contained 4.11 g of the initial 9.62 g of $NO_3$ input as nitric acid. Hence, the effective acidulation ratio, $HNO_3$:CaO, was 0.337. Other pertinent information concerning this experiment may be gleaned from Table I, supra.

EXAMPLE III

Nitric acid, 14.02 g, was added to 24.14 g of phosphate rock to give an initial acidulation ratio, $HNO_3$:CaO, of 0.786. The acidulation reaction was allowed to proceed at temperatures of 60° C. to about 70° C. for a period of 1 hour. The temperature was then increased to 180° C. to about 210° C. for a period of 5 hours. The resulting pyrolyzate was leached with water and the residue dried to give 21.41 g of solid product containing 34.2 percent total $P_2O_5$ and 13.6 percent available $P_2O_5$. X-ray examination showed the product to contain apatite as the major phase with dicalcium phosphate (in increased amount over that observed in Examples I and II) and quartz as the minor phases. The NaOH trap solution contained 4.57 g of the initial 9.62 g of $NO_3$ input as nitric acid. Hence, the effective acidulation ratio was 0.412. Other pertinent information may be obtained from an examination of Table I, supra.

EXAMPLE IV

Nitric acid, 35.11 g, was added to 48.28 g of phosphate rock to provide an initial acidulation ratio, $HNO_3$:CaO, of 0.984. The acidulate was maintained at 60° C. to about 80° C. for a period of 1 hour. The temperature was then increased to 170° C. to about 205° C. for a period of 6 hours. The resulting pyrolyzate was leached with water and the solid residue dried to give 41.35 g of product containing 35.4 percent total $P_2O_5$ and 18.9 percent available $P_2O_5$. X-ray examination showed the product to contain apatite and dicalcium phosphate as major phases with quartz as a minor phase. The NaOH trap solution contained 10.69 g of the initial 24.09 g of $NO_3$ input as nitric acid. Hence, the effective acidulation ratio, $HNO_3$:CaO, was 0.545. The observed molar ratio $NO_3$:CaO in the leachate was 1.93, again indicative of the presence of $Ca(NO_3)_2$. Other pertinent information may be derived from an examination of Table I, supra.

EXAMPLE V

Nitric acid, 35.11 g was added to 40.24 g of phosphate rock to provide an initial acidulation ratio, $HNO_3$:CaO, of 1.180. The acidulate was maintained at temperatures of 60° C. to about 80° C. for a period of 1 hour. The temperature was then increased to 180° C. to about 210° C. for a period of 6 hours. The resulting pyrolyzate was leached with water and the resulting residue dried to give 33.55 g of solid product containing 36.5 percent total $P_2O_5$ and 22.4 percent available $P_2O_5$. X-ray examination showed the product to contain major phases of dicalcium phosphate and apatite and a minor phase of quartz. The NaOH trap solution contained 11.17 g of the initial 24.09 g of $NO_3$ input as $HNO_3$. Hence, the effective acidulation ratio, $HNO_3$:CaO, was 0.633. Other pertinent information may be gleaned from Table I, supra.

EXAMPLE VI

Nitric acid, 35.11 g, was added to 34.49 g of phosphate rock to provide an initial acidulation ratio, $HNO_3$:CaO, of 1.377. The acidulate was allowed to digest at temperatures of 60° C. to about 90° C. for a period of 1 hour. The temperature was then increase to 180° C. to about 210° C. for a period of 5 hours. The resulting pyrolyzate was leached with water and dried to give 27.66 g of product containing 37.7 percent total $P_2O_5$ and 27.6 percent available $P_2O_5$. X-ray examination showed the product to consist of major phases of dicalcium phosphate and apatite and a minor phase of quartz. The NaOH trap solution was found to contain 10.91 g of the initial 24.09 g of $NO_3$ input as $HNO_3$. Hence, the effective acidulation ratio was 0.753. Other pertinent information concerning this test may be obtained from an examination of Table I, supra.

EXAMPLE VII

Nitric acid, 35.11 g, was added to 30.18 g of phosphate rock to provide an initial acidulation ratio, $HNO_3$:CaO, of 1.574. The acidulate was allowed to digest for a period of 1 hour at temperatures of 60° C. to about 80° C. The temperature was increased to 170° C. to about 200° C. and heating continued for a period of 6 hours. The resulting solid pyrolyzate was leached with water and filtered to give 23.57 g of product containing 38.4 percent total $P_2O_5$ and 30.9 percent available $P_2O_5$. X-ray examination showed the product to contain dicalcium phosphate as a major phase and apatite and quartz as minor phases. The NaOH trap solution was found to contain 11.25 g of the initial 24.09 g of $NO_3$ input as $HNO_3$. Hence, the effective acidulation ratio, $HNO_3$:CaO, was 0.838. Other pertinent information concerning this test may be obtained from an examination of Table I, supra.

EXAMPLE VIII

Nitric acid, 35.11 g, was added to 26.83 g of phosphate rock to provide an initial acidulation ratio, $HNO_3$:CaO, of 1.770. The acidulate was allowed to digest at temperatures of 60° C. to about 90° C. for a period of 1 hour. The temperature was then increased to 180° C. to about 210° C. for a period of 4 hours. The resulting pyrolyzate was leached with water and filtered to provide 20.05 g of solid product containing 39.9 percent total $P_2O_5$ and 36.3 percent available $P_2O_5$. X-ray examination showed the product to contain dicalcium phosphate as the major phase and apatite and quartz as the minor phases. The NaOH trap contained 11.14 g of the initial 24.09 g of $NO_3$ input as nitric acid. Hence, the effective acidulation ratio was 0.951. Other pertinent information concerning this test may be obtained from an examination of Table II, supra.

EXAMPLE IX

Nitric acid, 35.11 g, was added to 24.14 g of phosphate rock to provide an initial acidulation ratio, $HNO_3$:CaO, of 1.967. The acidulate was heated at temperatures of 60° C. to about 75° C. for a period of 1 hour. The temperature was increased to 180° C. to about 210° C. and heating continued for another 4 hours. The resulting pyrolyzate was leached with water and filtered to give 17.06 g of solid product containing 40.9 percent total $P_2O_5$ and 39.5 percent available $P_2O_5$. X-ray analysis showed the product to contain primarily dicalcium phosphate with a minor phase of quartz. The NaOH trap solution contained 10.82 g of the initial 24.09 g of $NO_3$ added as nitric acid. Hence, the effective acidulation ratio, $HNO_3$:CaO, was 1.083. Other pertinent information concerning this particular test may be obtained from an examination of Table II, supra.

EXAMPLE X

Nitric acid, 35.11 g, was added to 24.14 g of phosphate rock to provide an initial acidulation ratio, $HNO_3$:CaO, of 1.967. The acidulate was allowed to digest at temperatures of 60° C. to about 70° C. for a period of 1 hour. The temperature was then increased to 190° C. to about 210° C. and heating continued for 3 hours. The resulting pyrolyzate was leached with water and filtered to give 17.79 g of solid product containing 40.5 percent total $P_2O_5$ and 39.0 percent available $P_2O_5$. X-ray analysis showed the product to consist primarily of dicalcium phosphate with a minor phase of quartz. The NaOH trap solution contained 11.69 g of the initial 24.09 g of $NO_3$ added as nitric acid. Hence, the effective acidulation ratio, $HNO_3$:CaO, was 1.012. Other pertinent information concerning this instant test may be obtained from an examination of Table II, supra.

EXAMPLE XI

Nitric acid, 35.11 g, was added to 21.95 g of phosphate rock to provide an initial acidulation ratio, $HNO_3$:CaO, of 2.164. The acidulate was heated at temperatures of 60° C. to about 80° C. for a period of 1 hour and then for 3 hours at temperatures of 190° C. to about 230° C. The resulting solid pyrolyzate was leached with water and filtered to give 15.66 g of solid product containing 41.7 percent total $P_2O_5$ and 41.2 percent available $P_2O_5$. X-ray examination of the product showed it to contain a major amount of dicalcium phosphate with a minor phase consisting of quartz. The NaOH trap solution contained 11.28 g of the 24.09 g of $NO_3$ initially added as nitric acid. Hence, the effective acidulation ratio, $HNO_3$:CaO, was 1.150. Additional information concerning this experiment may be obtained from an examination of Table II, supra.

EXAMPLE XII

Nitric acid, 35.11 g was added to 21.95 g of phosphate rock to provide an initial acidulation ratio, $HNO_3$:CaO, of 2.164. The acidulate was heated at temperatures of 60° C. to about 80° C. for a period of 1 hour. The temperature was then increased to 180° C. to about 210° C. and heating continued for an additional 3 hours. The resulting pyrolyzate was leached with water, filtered, and dried to provide 14.69 g of solid product containing 40.6 percent total $P_2O_5$ and 40.5 percent available $P_2O_5$. X-ray analysis showed the product to consist essentially of dicalcium phosphate with quartz as a minor phase. The NaOH trap solution contained 11.34 g of the initial 24.09 g of $NO_3$ added as nitric acid. Hence, the effective acidulation ratio, $HNO_3$:CaO, was 1.144. Additional information concerning this test may be obtained from an examination of Table II, supra.

EXAMPLE XIII

Nitric acid, 35.11 g was added to 21.95 g of phosphate rock to provide an initial acidulation ratio, $HNO_3$:CaO, of 2.164. The acidulate was heated at temperatures of 60° C. to about 70° C. for a period of 1 hour. The temperature was then increased to 180° C. to about 210° C. for a period of 7 hours. The resulting pyrolyzate was leached with water, filtered, and dried to give 15.50 g of solid product containing 40.9 percent total $P_2O_5$ and 40.6 percent available $P_2O_5$. X-ray examination showed the product to consist primarily of dicalcium phosphate with a minor phase consisting of quartz. The NaOH trap solution contained 12.15 g of the initial 24.09 g of $NO_3$ added as nitric acid. Hence, the effective acidulation ratio, $HNO_3$:CaO, was 1.072. The leachate-filtrate solution contained nitrate and calcium in the ratio, $NO_3$:Ca, of 1.82, indicating the presence of by-product $Ca(NO_3)_2$. Other pertinent information concerning this experiment may be obtained from an examination of Table II, supra.

EXAMPLE XIV

Phosphate rock, 24.14 g, was placed in a glass beaker to which 35.11 g of nitric acid was then added to provide an initial acidulation ratio, $HNO_3$:CaO, of 1.967. The acidulate was heated on a hot plate at 60° C. to about 70° C. for a period of 1 hour. The acidulate was filtered using a coarse fritted sintered glass filter to remove the gangue. The filtered acidulate was transferred to the Teflon reaction system and heated at temperatures of 180° C. to about 210° C. for a period of 7 hours. The resulting pyrolyzate was leached with water, filtered, and dried to provide 13.31 g of solid product containing 48.0 percent total $P_2O_5$ and 47.4 percent available $P_2O_5$. X-ray analysis indicated that the product was essentially homogeneous as dicalcium phosphate. Chemical analysis gave: 25.0 percent Ca, 48.0 percent $P_2O_5$, 0.70 percent Fe, 0.83 percent Al, 0.28 percent Mg, 2.51 percent F, 0.20 percent Si, 0.79 percent N, 0.63 percent citrate insoluble $P_2O_5$, and 1.67 percent water soluble $P_2O_5$. X-ray analysis of the 3.30 g of recovered and washed gangue showed the presence of quartz and $Fe_3KH_{14}(PO_4)_8 \cdot 4H_2O$.

EXAMPLE XV

Phosphate rock, 21.95 g, was placed in a glass beaker to which 35.11 g of nitric acid was added to provide an initial acidulation ratio, $HNO_3$:CaO, of 2.164. The acidulate was heated on a hot plate at temperatures of 65° C. to about 80° C. for a period of 1 hour. The mixture was filtered using a coarse fritted sintered glass filter. The resulting filtrate was transferred to the Teflon reaction system and heated at temperatures of 180° C. to about 210° C. for a period of 6 hours. The resulting pyrolyzate was leached with water, filtered, and dried to produce 13.54 g of solid product containing 47.1 percent total $P_2O_5$ and 46.8 percent available $P_2O_5$. X-ray analysis showed the product to be homogeneous as dicalcium phosphate. Chemical analysis of the product gave: 24.6 percent Ca, 47.1 percent $P_2O_5$, 1.08 percent Fe, 0.94 percent Al, 0.28 percent Mg, 2.74 percent F, 0.36 percent Si, 0.78 percent N, 0.31 percent citrate insoluble $P_2O_5$, and 0.94 percent water soluble $P_2O_5$. X-ray analysis of the 2.61 g of recovered and washed gangue showed the presence of quartz and $Fe_3KH_{14}(PO_4)_8 \cdot 4H_2O$.

INVENTION PARAMETERS

After sifting and winnowing through the data presented in the examples, supra, as well as other data which we have assembled in discovering and developing the present invention, we have determined that the operable parameters of the present invention are as follows:

| Processing Conditions | Operating Range | Preferred (About) |
|---|---|---|
| Acidulation Stage | | |
| Nitric acid concentration, wt % | 40–71 | 55–71 |
| Acidulation ratio, HNO3:CaO, M/M | 0.4–2.4 | 1.8–2.2 |
| Acidulation temperature, °C. | 60–100 | 70–80 |
| Acidulation time, hr | 0.3–2 | 1 |
| Pyrolysis Stage | | |
| Pyrolysis temperature, °C. | 160–270 | 180–230 |
| Pyrolysis time, hr | 2–10 | 3–7 |

Having shown and described particular embodiments, we realize that those skilled in the art will conceive numerous improvements, modifications, and variations thereof which are, nevertheless, within the spirit and scope of our invention. We wish it understood, therefore, that the appended claims are intended to cover such improvements, modifications, and variations.

What we claim and desire to secure by Letters Patent of the United States is:

1. A process for the preparation of dicalcium phosphate containing phosphatic fertilizers and intermediate by-product aqueous calcium nitrate; which process comprises the steps of:
    (a) introducing into reactor means predetermined quantities of nitric acid and particulate phosphate rock in proportions relative to one another to effect therein a mole ratio of $HNO_3$:CaO in the range of from about 0.4 to about 2.4, said nitric acid being of a concentration ranging from about 40 percent to about 71 percent by weight;
    (b) maintaining in said reactor means the materials therein introduced for a period of time in the range of from about 20 minutes to about 2 hours at temperatures in the range of from about 60° C. to 100° C. to thereby effect the acidulation of said particulate phosphate rock introduced in step (a), supra;
    (c) removing from said reactor means the nitrogen oxide gases formed therein and introducing same into later mentioned absorption means;
    (d) removing at least a portion of the acidulate effected in step (b), supra, from said reactor means and introducing same into heating means;
    (e) maintaining the materials introduced into said heating means in step (d), supra, at temperatures in the range of from about 160° C. to about 270° C. and for periods of time in the range from about 2 hours to about 10 hours to effect the formation therein of a resulting solid pyrolyzate;
    (f) removing from said heating means at least portions of the nitric acid, oxides of nitrogen, and water vapor formed therein and introducing same into absorption means for mixing with air, aqueous media, and make up nitrogen oxides as well as said nitrogen oxide gases introduced in step (c), supra, to effect therein the production of nitric acid;
    (g) removing at least a portion of the nitric acid produced in said absorption means in step (f), supra, and introducing same as recycle to said reactor means;
    (h) removing from said heating means the resulting solid pyrolyzate formed in step (e), supra, and introducing same, along with a stream of water to leach filtering means;
    (i) removing the solid filter cake formed in said leach filter means and effected in step (h), supra, and transferring same into granulation and sizing means from whence solid phosphatic fertilizer products are recovered; and
    (j) removing the aqueous calcium nitrate containing filtrate formed in said leach filter means and effected in step (h), supra, and recovering same as intermediate fluid nitrate fertilizer product;
said process being characterized by the fact that said phosphatic fertilizer product is effected with an effective acidulation ratio ranging from about 0.2 to about 1.2 moles of $HNO_3$:CaO, said effective acidulation ratio being in dependent and proportional relationship to said initial $HNO_3$:CaO mole ratio in step (a), supra.

2. The process of claim 1 wherein said $HNO_3$:CaO mole ratio in step (a) is maintained in the range of from about 1.8 to 2.2 and wherein said process is further characterized with an effective acidulation ratio ranging from about 0.9 to about 1.15.

3. The process of claim 2 wherein the materials are maintained in said reactor means for a period of time of about 1 hour.

4. The process of claim 3 wherein the materials maintained in said reactor means are subjected to temperatures ranging from about 70° C. to about 80° C.

5. The process of claim 4 wherein the materials are maintained in said heated means for a period of time ranging from about 3 to about 7 hours.

6. The process of claim 5 wherein the materials maintained in said heating means are subjected to temperatures in the range from about 180° C. to about 230° C.

7. The process of claim 2 wherein the acidulate removed from said reactor means is introduced into separation means to effect separation of a substantial portion of the gangue associated with said acidulate and wherefrom the resulting substantially gangue free acidulate is subsequently introduced into said heating means.

8. The process of claim 7 wherein the materials are maintained in said reactor means for a period of time for about 1 hour.

9. The process of claim 8 wherein the materials maintained in said reactor means are subjected to temperatures ranging from about 70° C. to about 80° C.

10. The process of claim 9 wherein the materials are maintained in said heating means for a period of time ranging from about 3 to about 7 hours.

11. The process of claim 10 wherein the materials maintained in said heating means are subjected to temperatures in the range from about 180° to about 230° C.

* * * * *